Figure 1:
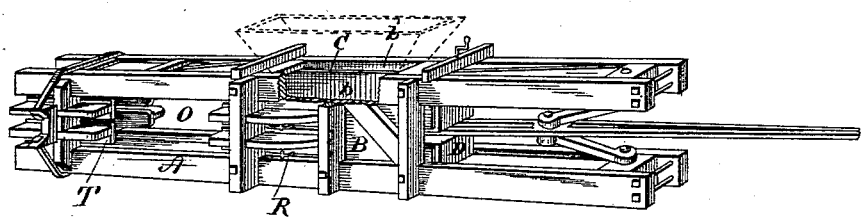

(No Model.) 2 Sheets—Sheet 1.
P. K. DEDERICK.
BALING PRESS.

No. 457,631. Patented Aug. 11, 1891.

Witnesses.
Chas. R. Burr
Thomas Durant

Inventor
Peter K. Dederick
By Church & Church
his Attorneys.

THE NORRIS PETERS CO., PHOTO-LITHO., WASHINGTON, D. C.

(No Model.)

P. K. DEDERICK.
BALING PRESS.

No. 457,631.  Patented Aug. 11, 1891.

2 Sheets—Sheet 2.

Witnesses.
Chas. R. Burr.
Thomas Durant.

Inventor.
Peter K. Dederick
By Church & Church
his Attorneys.

UNITED STATES PATENT OFFICE.

PETER K. DEDERICK, OF LOUDONVILLE, NEW YORK.

BALING-PRESS.

SPECIFICATION forming part of Letters Patent No. 457,631, dated August 11, 1891.

Application filed March 30, 1886. Serial No. 197,179. (No model.)

*To all whom it may concern:*

Be it known that I, PETER K. DEDERICK, of Loudonville, in the county of Albany and State of New York, have invented certain new and useful Improvements in Baling-Presses; and I do hereby declare the following to be a full, clear, and exact description of the same, reference being had to the accompanying drawings, forming a part of this specification, and to the letters of reference marked thereon.

My invention relates particularly to that class of baling-presses known as "continuous" or "perpetual" presses, in which the bales are formed or built up in sections in a bale-chamber by means of a reciprocating traverser or plunger working within a press-box and operating to force into said bale-chamber successive charges of material fed in front of said traverser.

In order to form compact bales by this class of presses, it has heretofore been found necessary to make the bales comparatively small in size for two reasons—first, because where large bales were attempted to be formed the middle portion of each section would bulge out or expand back after the pressure of the traverser had been removed to such an extent as to render the retainers employed ineffectual to hold it, and, secondly, because, owing to the large expansive surface, too much power was required to do the pressing.

It is the principal object of my present invention to so improve the construction of presses of this kind as to render it practicable to form large-size sectional bales composed of sections even smaller and more numerous than those composing the old form of bale. To this end I form the bale-chamber of dimensions sufficient to accommodate a bale of the desired size, and the press-box, from which the sectional charges are forced into the bale-chamber to build up the bale, I divide into two compartments by a longitudinal partition in such a way as to produce, in effect, two press-boxes, and in each of these compartments or press-boxes I arrange a traverser, which is adapted to press or condense charges of material deposited in front of said traverser and force such charges into the bale-chamber, where they are held or kept from undue back expansion by retainers located at the sides of the bale-chamber, as well as by the end of the partition itself. The traversers in the two compartments may be connected and operated by the same power devices, so as to be moved forward and backward together, or the traversers may be disconnected and operated upon alternately by the same power devices, or each traverser may be provided with its own separate power device; but whichever plan is adopted the operation would be substantially the same—that is to say, each time either of the traversers is forced forward it carries a charge of material from its compartment or press-box into the bale-chamber and deposits the same there, and when a sufficient number of charges have accumulated to form a bale they are tied off in the usual manner. Bales thus formed are not only composed of sucessive layers or sections, but each layer is also divisible transversely into sections, thereby enabling them to be separated with the greatest convenience for feeding to stock.

The hopper, through which the material to be pressed is fed to the press-box, I preferably divide by means of a partition, so that the material fed into it will be preliminarily separated into loose charges before being fed into the separate compartments of the press-box. I may in this connection say that this divided or two-part hopper can also be used to advantage upon presses in which there is but one press-box and one bale-chamber, where it is desired to secure bales divisible into smaller sections than ordinarily, since the effect of its use is to cause two charges to be deposited in front of the traverser before each stroke, and these charges, even under compression, preserve their identity and can be readily separated when the bale of which they form a part is opened.

Figure 2:
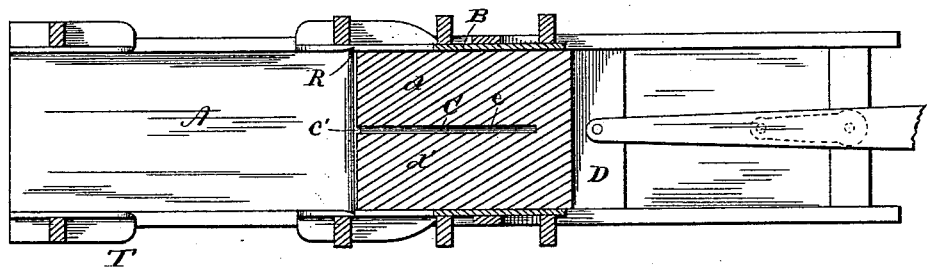
Figure 3:
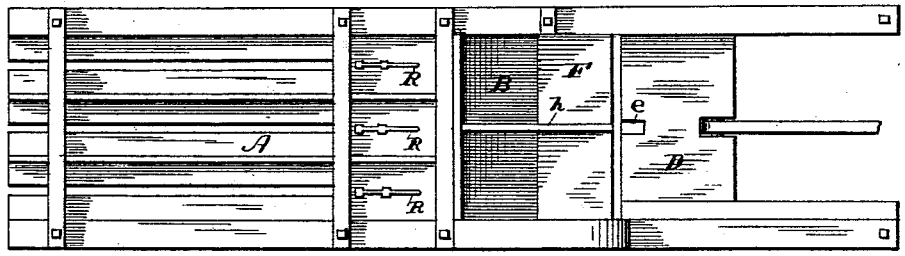
Figure 4:
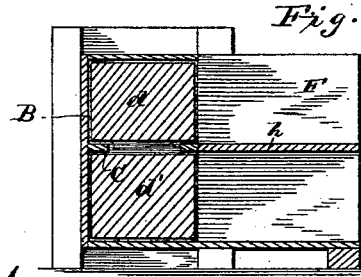
Figure 5:
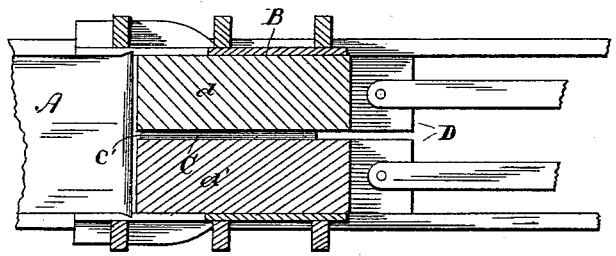
Figure 6:
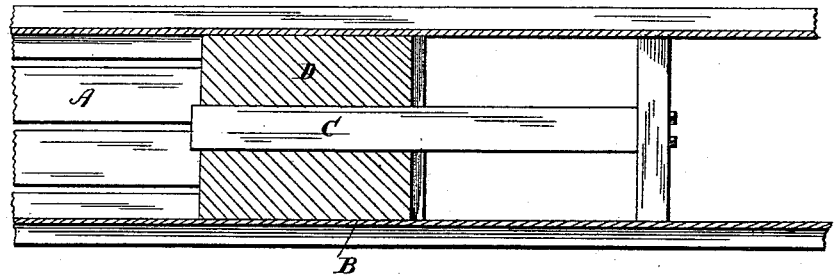

Referring to the accompanying drawings, Figure 1 represents a perspective view of a press constructed in accordance with my invention; Fig. 2, a longitudinal horizontal sectional view of the same; Fig. 3, a view of a press in which the feed-hopper is located at the side; Fig. 4, a cross-sectional view of the form of press shown in Fig. 3; Fig. 5, a modification of the invention in which two independent traversers are used within the divided or two-part press-box; Fig. 6, another modification of the invention; Figs. 7 to 10, views illustrating certain forms of attachments to the exit end of the bale-chamber for avoiding tearing or chafing of the sides of the bale.

Similar letters of reference in the several figures indicate the same parts.

A, Figs. 1 and 2, represents the bale-chamber of the press, having open sides part way, as shown.

B is the press-box, divided into two compartments $b\ b'$ by a longitudinal partition C, and D is the traverser, slotted at $e$ to admit the partition C and to allow the portions $d\ d'$ to enter the compartments $b\ b'$, respectively, of the press-box and form, in effect, separate traversers for said compartments.

F is the feed-hopper, through which the material to be baled is inserted in the press-box.

The power device shown, or any other one, may be used to give the desired motion to the traverser.

In operation the material is fed into both compartments of the press-box, and as the traverser advances each portion $d\ d'$ of it compacts the charge of material in front of said traverser and forces said charge into the bale-chamber, where it is retained and prevented from retreating when the traverser moves back by the operation of ordinary retainers R, applied at the junction of the press-box and bale-chamber, as ordinarily, and by the end $c'$ of the partition C. When a sufficient number of charges have in this manner been forced into the bale-chamber, they are tied off into a bale, as usual, the tying-wires being passed through the sides of the bale-chamber, as ordinarily.

In the press shown in Figs. 1 and 2 the partition which divides the press-box into two compartments extends from top to bottom of the press-box; but this is not necessary, as the same result can be accomplished by merely applying strips to opposite sides of the press-box, as shown in the modification, Fig. 4. In fact the only essential point to be observed in the construction of this partition is that it shall serve to support the middle portion of the bale in process of formation in the bale-chamber and shall prevent the bulging back of the same. A bar or timber supported firmly at the power end of the press and extending longitudinally through the traverser to a point where the bale-chamber commences, as shown in Fig. 6, will answer the purpose.

The feed-opening may be at the top of the press and an ordinary hopper employed, as shown in dotted lines in Fig. 1, or it may be located at the side of the press and provided with a partition $h$, as shown in Fig. 3, if desired.

Figure 7:
Figure 8:
Figure 9:
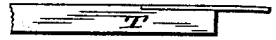
Figure 10:
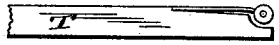

In order to prevent the tearing or chafing of the bales upon the ends of the timbers T, which project toward the side openings O of the bale-chamber, I round or bevel said ends, as shown in Figs. 1 and 7, or bevel them, as shown in Fig. 8, or provide spring-extensions, as in Fig. 9, or friction-rollers, as in Fig. 10, and thus effectually accomplish the desired result.

In Fig. 5 two separate traversers are employed in the two compartments of the press-box, and a power device is used in connection with them that operates upon them alternately. Of course two independent power devices, one for each traverser, might be employed instead of this arrangement.

Where a single power device is employed to act alternately upon two traversers, much less power is required than where a single traverser acting upon larger charges is used, and this principle of economy in power resulting from the employment of a plurality of traversers acting upon comparatively small charges is applicable where the partition in the press-box is omitted.

I claim as my invention—

1. In a baling-press, the combination, with two press-boxes and their respective traversers, of a common bale-chamber in which the independent charges forced from the two press-boxes by the said traversers are received and formed into a column, substantially as described.

2. In a baling-press, the combination, with two press-boxes and their respective traversers, of a common bale-chamber in which the charges forced from the two press-boxes by the said traversers are received and formed into a column, and supports, substantially such as described, for sustaining the formed column at or near its middle, substantially as described.

3. In a baling-press, the combination of a two-part press-box having a traverser working in each part, a common bale-chamber into which the charges from the two parts of the press-box are received and built up, and a two-part hopper leading to the two-part press-box, substantially as described.

PETER K. DEDERICK.

Witnesses:
CYRUS R. DEDERICK,
R. J. VAN SCHOONHOVEN.